United States Patent
Van Brocklin et al.

(10) Patent No.: US 7,188,348 B2
(45) Date of Patent: Mar. 6, 2007

(54) OPTICAL DISC DRIVE APPARATUS AND METHOD

(75) Inventors: Andrew L. Van Brocklin, Corvallis, OR (US); David Pettigrew, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 556 days.

(21) Appl. No.: 10/824,103

(22) Filed: Apr. 14, 2004

(65) Prior Publication Data

US 2005/0232113 A1 Oct. 20, 2005

(51) Int. Cl.
*G11B 7/085* (2006.01)
*G01C 1/00* (2006.01)

(52) U.S. Cl. ........................ 720/660; 720/666; 720/681; 356/150; 369/244.1

(58) Field of Classification Search ................. 720/660, 720/666, 681; 356/150; 369/244.1; G11B 7/085, G11B 7/00; G01C 1/00
See application file for complete search history.

(56) References Cited

U.S. PATENT DOCUMENTS

| 4,701,050 A | * | 10/1987 | Oshida et al. | ......... 356/139.07 |
| 5,473,424 A | * | 12/1995 | Okumura | ............... 356/139.03 |
| 5,760,564 A | * | 6/1998 | Novak | ........................ 318/687 |

* cited by examiner

*Primary Examiner*—Aristotelis M. Psitos (57) ABSTRACT

An optical pickup unit (OPU) includes a moveable structure that is moved by a voice coil motor component in response to an input signal. The moveable structure includes a pattern that is moved corresponding to the input signal. An encoder reads the pattern to generate an output signal that corresponds to pattern movement as the input signal is applied over a period of time. A controller calculates a calibration factor relating the pattern movement to the input signal.

30 Claims, 5 Drawing Sheets

OPTICAL DISC DRIVE APPARATUS AND METHOD

BACKGROUND

Optical discs, such as compact discs (CD) and digital versatile discs (DVD) are a form of computer readable media which provide extensive storage for digital information. One side of an optical disc may contain data and is referred to as a data side. The data side may be read only, or may also be written to. The other side of the optical disc that does not contain data may provide for a label and is referred to as the label side. In particular cases, a side or both sides may provide for data and a label.

An optical disc drive (ODD) of a computer may be used to read from and may write to a data side of an optical disc. An optical pickup unit (OPU), included within the optical disc drive, is configured with a laser and sensors adapted for reading, and possibly writing, data. Various ODDs and OPUs are available, and are manufactured to specifically read from and write to the data side of optical discs.

Using emerging technology, the OPU assembly may be used to produce an image on the label surface of an optical disc configured for such a labeling process. Producing the image includes positioning the OPU assembly at concentric circles of the optical disc where the image is written, and focusing an objective lens of a laser beam that performs the actual printing of the image on the optical disc. In certain embodiments, a material is applied to the label surface. The material reacts to create an image as the laser beam is applied.

Typically a voice coil motor (VCM) assembly carries the objective lens that focuses the laser beam used to label an optical disc. A VCM assembly may include one or more moveable VCM components such as metal coils which are activated by a voltage (or current) input that causes fine control movement of the objective lens in a particular direction. For example a moveable VCM component may cause the objective lens to move into and out of focus; another moveable VCM component may cause the objective lens to move to a track; and another moveable VCM component may cause the objective lens to tilt in an angular direction to the label surface.

The moveable VCM component that moves the objective lens in and out of focus is provided a voltage (or current) signal that moves the objective lens a predetermined distance. In order to move the objective lens the predetermined distance, calibration information defining how much movement is performed per amount of voltage (current) input applied to the moveable VCM component is utilized. For example, a moveable VCM component may be calibrated to move 1 micron per 1 mV applied. Therefore to move a 30 micron distance, 30 mV would be applied to (or removed from) the VCM component.

In some applications, the VCM component may also be affected by drift. Drift is defined as positional variances over time, operational usage, and temperature. For a particular VCM component, drift is the variation of movement or physical position for a given applied input voltage (current). In other words, although the voltage or current input applied to the particular moveable VCM component should cause it to move to a specific position, because of drift the actual resultant position may be different. Therefore the calibration of the moveable VCM component may change with drift. For example, instead of a 1 micron movement per 1 mV applied as per the example described above, drift may result in more or less than a 1 micron movement when 1 mV is applied.

Accordingly, there is a need for the present invention.

SUMMARY

An optical pickup unit (OPU) includes a moveable structure that is moved by a voice coil motor component in response to an input signal. The moveable structure includes a pattern that is moved corresponding to the input signal. An encoder reads the pattern to generate an output signal that corresponds to pattern movement as the input signal is applied over a period of time. A controller calculates a calibration factor relating the pattern movement to the input signal.

BRIEF DESCRIPTION OF THE DRAWINGS

The following detailed description refers to the accompanying figures. In the figures, the left-most digit(s) of a reference number identifies the figure (Fig.) in which the reference number first appears. Moreover, the same reference numbers are used throughout the drawings to reference like features and components.

DETAILED DESCRIPTION

Overview

The following discussion is directed to systems and methods for measuring drift variations and determining actual calibration of a moveable voice coil motor (VCM) component manipulates a lens used in labeling an optical disc.

Exemplary System Environment

Figure 1:
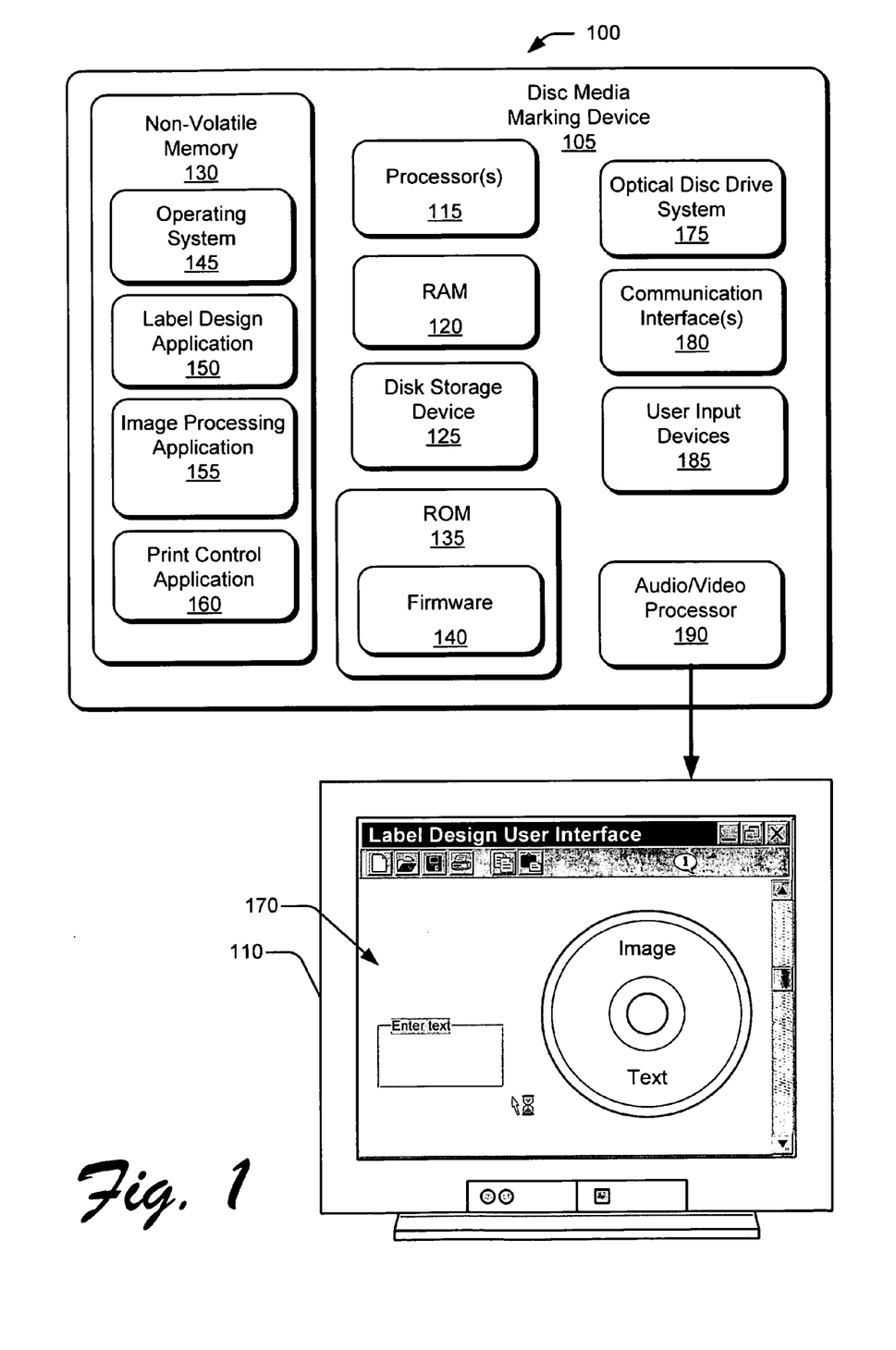
FIG. 1 is a block diagram illustrating an exemplary disc media marking system that may be used for measuring input signal values to moveable voice coil motor components and measure actual calibration rates of the moveable voice coil motors, according to an embodiment of the present invention.

FIG. 1 shows an exemplary disc media marking system 100 for performing recalibration of input signal values to control voice coil motors that provide offsets. The marking system 100 includes a disc media marking device 105 and a display device 110. The disc media marking device 105 may be implemented as a stand-alone appliance device for labeling disc media. Alternatively, the disc media marking device 105 may be integrated as part of an optical media player or drive, such as a writable compact disc (CD) player which is implemented to label an optical disc as well as record data onto a CD-R (CD recordable disc) and/or a CD-RW (CD-rewritable disc). Such writable CD devices may include, for example, a stand-alone audio CD player which is a peripheral component in an audio system, a CD-ROM drive integrated as standard equipment in a PC (personal computer), a DVD (digital versatile disc) player, and any number of similar embodiments.

Disc media marking device 105 typically includes one or more processors 115 (e.g., any of microprocessors, controllers, and the like) which process various instructions to control the operation of disc media marking device 105 and communicate with other electronic and computing devices. Disc media marking device 105 may be implemented with one or more memory components, examples of which include a random access memory (RAM) 120, a disc storage device 125, and non-volatile memory 130 (e.g., any one or more of a read-only memory (ROM) 135, flash memory, EPROM, EEPROM, etc.).

Disc storage device 125 may include any type of magnetic or optical storage device, such as a hard disc drive, a magnetic tape, a recordable and/or rewriteable compact disc (CD), a DVD, DVD+RW, and the like. The one or more memory components provide data storage mechanisms to store various information and/or data such as configuration information for disc media marking device 105, graphical user interface information, and any other types of information and data related to operational aspects of disc media marking device 105. Alternative implementations of disc media marking device 105 may include a range of processing and memory capabilities, and may include any number of differing memory components than those shown in FIG. 1.

Disc media marking device 105 may include a firmware component 140 which is implemented as a permanent memory module stored on ROM 135, or with other components in disc media marking device 105, such as a component of a processor 115. Firmware 140 is programmed and distributed with disc media marking device 105 to coordinate operations of the hardware within disc media marking device 105 and contains programming constructs used to perform such operations.

An operating system 145 and one or more application programs may be stored in non-volatile memory 130 and executed on processor(s) 115 to provide a runtime environment. A runtime environment facilitates extensibility of disc media marking device 105 by allowing various interfaces to be defined that, in turn, allow the application programs to interact with disc media marking device 105. In this example, the application programs include a label design application 150, an image processing application 155, and a print control application 160.

The label design application 150 generates a label design user interface 170 for display on display device 110 from which a user may create a label image to be rendered on a disc media, such as on an optical disc. A user may specify text, a bitmap image for background, a digital photo, a graphic or symbol, and/or any combination thereof to create the label image via the user interface 170.

The image processing application 155 processes the label image created with the label design user interface 170 to produce a data stream of label image data and laser control data to render the image on concentric circular tracks of a disc media (i.e., an optical disc). For example, a continuous tone RGB (red, green, and blue) rectangular raster graphic of the label image may be converted to concentric circular tracks. The curved raster may be color mapped and separated into the printing color channels KCMY (black, cyan, magenta, and yellow), or into grayscale. This data stream is formatted as laser control data and is augmented with other control commands to control the disc media marking device 105 rendering a label on the disc media.

A label file may be generated and may be communicated to a controller 280 (FIG. 2) where the label file is parsed to control a labeling mechanism. Alternatively, the concentric circular tracks may be generated and streamed to the disc media marking device 105 one track at a time to utilize host processing with the device's rendering process.

The print control application 160 determines the radius of the first track and the subsequent track spacing. After the radius of the first track and the track spacing is determined, the print control application 160 determines which label image data will correspond to each respective track. The laser mark locations along a particular track are specified in a coordinate system where the concentric circular tracks are defined in coordinates of the radial distance and the distance along each respective track.

Disc media marking device 105 includes an optical disc drive (ODD) system 175 which may be implemented to mark a surface of a disc media (i.e., optical disc), such as to render a label image on a label surface (i.e., label side) of an optical disc. The ODD system 175 is described in greater detail herein below with reference to FIG. 2.

Disc media marking device 105 may further include one or more communication interfaces 180 which may be implemented as any one or more of a serial and/or parallel interface, as a wireless interface, any type of network interface, and as any other type of communication interface. A wireless interface enables disc media marking device 105 to receive control input commands and other information from an input device, such as from a remote control device or from another infrared (IR), 802.11, Bluetooth, or similar RF input device. A network interface provides a connection between disc media marking device 105 and a data communication network which allows other electronic and computing devices coupled to a common data communication network to send label image data and other information to disc media marking device 105 via the network. Similarly, a serial and/or parallel interface provides a data communication path directly between disc media marking device 105 and another electronic or computing device.

Disc media marking device 105 may include user input devices 185 which may include a keyboard, pointing device, selectable controls on a user control panel, and/or other mechanisms to interact with, and to input information to disc media marking device 105. Disc media marking device 105 also includes an audio/video processor 190 which generates display content for display on display device 110, and generates audio content for presentation by a presentation device, such as one or more speakers (not shown). The audio/video processor 190 may include a display controller which processes the display content to display corresponding images on display device 110. A display controller may be implemented as a graphics processor, microcontroller, integrated circuit, and/or similar video processing component to process the images. Video signals and audio signals may be communicated from disc media marking device 105 to display device 110 via an RF (radio frequency) link, S-video link, composite video link, component video link, or other similar communication link.

Although shown separately, some of the components of disc media marking device 105 may be implemented in an application specific integrated circuit (ASIC). Additionally, a system bus (not shown) typically connects the various components within disc media marking device 105. A system bus may be implemented as one or more of any of several types of bus structures, including a memory bus or memory controller, a peripheral bus, an accelerated graphics port, or a local bus using any of a variety of bus architectures. Furthermore, disc media marking device 105 may share a system bus with a host processor.

Exemplary ODD Embodiment

Figure 2:
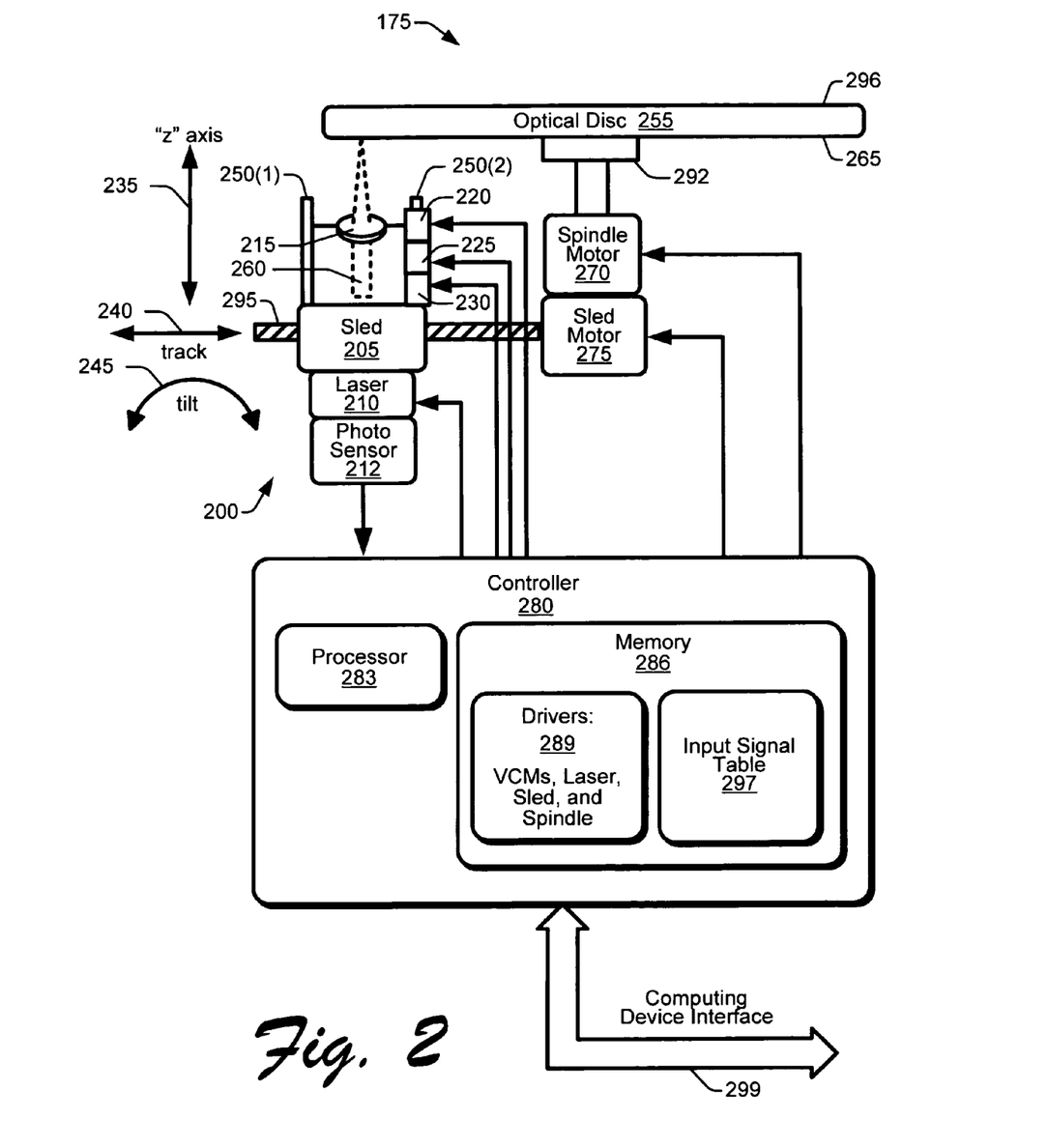
FIG. 2 is a block diagram illustrating an exemplary optical disc drive system that includes three moveable VCM components that provide movement of a lens in three directions, according to an embodiment of the present invention.

FIG. 2 shows an exemplary embodiment of the ODD system 175 shown in FIG. 1. The ODD system 175 includes an optical pickup unit (OPU) assembly 200 that includes a sled 205, a laser 210, a photo sensor 212, a lens or an objective lens 215, a moveable voice coil motor (VCM) component 220, a moveable VCM component 225, and a moveable VCM component 230. In particular embodiments, moveable components VCM 220, 225, and 235 are part of a combined VCM assembly. Moveable VCM components 220, 225, and 235 respond to an applied input voltage or current (input signal), and in turn cause the objective lens 215 to move. Specifically, moveable VCM component 220 moves objective lens 215 in a "z" axis 235 direction; moveable VCM component 225 moves objective lens 215 in a "track" 240 direction; and moveable VCM component 230 moves objective lens 215 in an angular or "tilt" 245 direction.

For purposes of illustration, the objective lens 215 is carried by supports 250(1), 250(2). The objective lens 215 is configured for travel along the "z" axis 235 direction perpendicular to an optical disc 255; in a radial 240 direction parallel to optical disc 255; and along tilt direction 245 at an angle to optical disc 255.

In some embodiments, determinations of the "in focus" position of the objective lens 215 for a variety of different locations on optical disc 255 are made during a mapping process. An input signal is applied to moveable VCM components 220, 225, and 230 and varied until a photo sensor 212 determines that an "in focus" condition exists, and the corresponding value of the input signal (i.e., voltage signal) is noted. However, for some applications, the "in focus" position is not optimal. For example, in order to evenly spread out heat from a laser beam 260 onto material on a label side surface 265 of optical disc 255 to create high quality markings on the label side surface 265, the objective lens 215 is moved from the "in focus" position to a "focus offset" position. This may be done by changing the input signal applied to the appropriate VCM component.

Offset positions, such as the focus offset position, may be achieved by applying a particular input signal to specific moveable VCM components. Such offset positions are typically expressed as distance values, though in other embodiments they might be, for example, angular values. For example, assume a desired focus offset position is 30 microns. A calibration factor, such as the input signal required to move a given distance unit (i.e., millivolts per micron) for the moveable VCM component, is used to determine a change in input signal to position the objective lens 215 at a 30 micron focus offset.

Figure 3A:
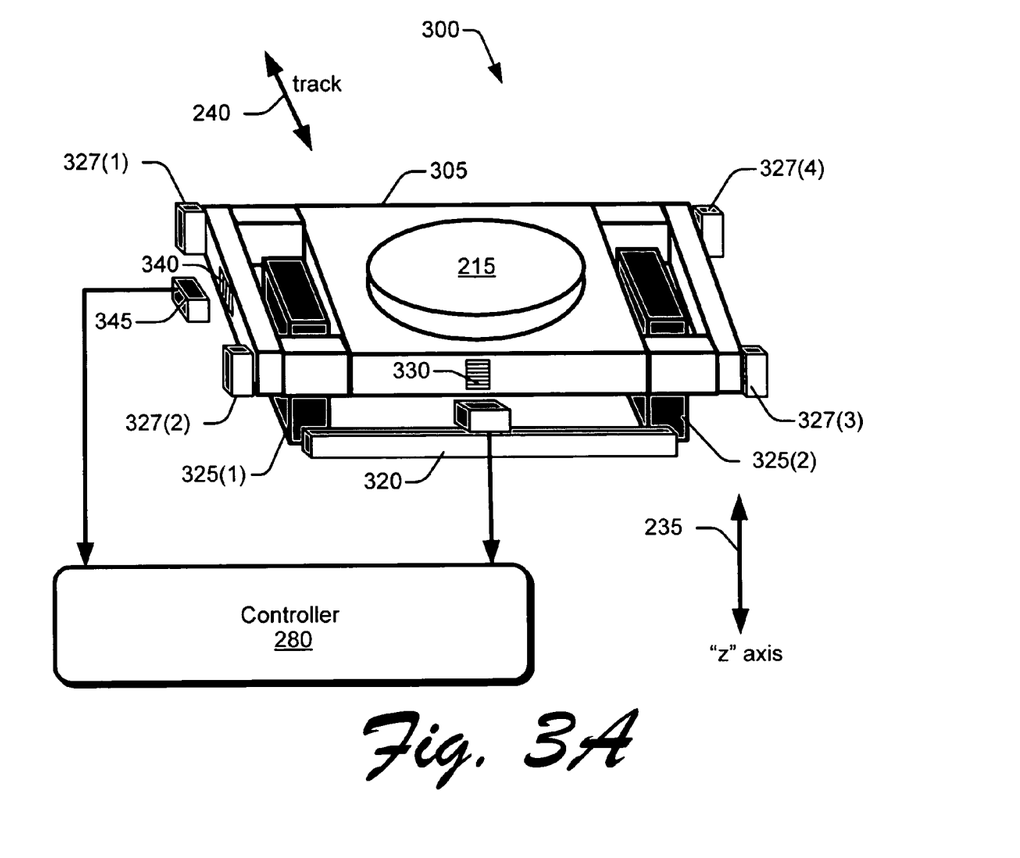
FIG. 3A is a block diagram illustrating an exemplary VCM assembly that includes code strips and encoders to measure VCM movement and calibration or rate of movement of moveable VCM components per input voltage in the "z" and "track" directions, according to an embodiment of the present invention.

However, due to drift variances, the calibration factor may change with time, usage, and/or temperature. To mitigate the adverse effects of drift variances, the calibration factor may be recalculated periodically. In one embodiment, code strips and encoders, as described below in FIG. 3, may be used to determine the calibration factor periodically.

The laser beam 260 is generated by the laser 210 and directed onto (reflected on) the label side surface 265 of optical disc 255. The laser beam 260 creates laser marks that correspond to label image data to render an image of the label side of the optical disc 255.

The ODD system 175 includes a spindle motor 270, a sled motor 275, and a controller 280. Sled motor 275 moves OPU assembly 200 to particular radial positions or tracks of optical disc 255. Sled motor 275 is calibrated to move to this particular position by receiving a corresponding input signal from controller 280. Sled motor 275 provides a coarse movement of the OPU assembly as to radial positions of optical disc 255, and moveable VCM component 225 provides fine adjustment for the position of objective lens 215 in the track direction 240.

In some embodiments, controller 280 may be implemented as a printed circuit board employing a combination of various components discussed above with respect to the disc media marking system 100 of FIG. 1. Accordingly, controller 280 may include a processor 283 for processing computer/processor-executable instructions from various components stored in a memory 286. Processor 283 may be one or more of the processors 115 discussed above with respect to the disc media marking system 100 of FIG. 1. Likewise, memory 286 may be the non-volatile memory 130 and/or firmware 140 of disc media marking system 100 of FIG. 1.

Drivers 289, including a laser driver, sled driver, and spindle driver are stored in memory 286 and executable on processor 283. Although these components are represented in the FIG. 2 embodiment as software components stored in memory 286 and executable on processor 283, they may also be implemented as firmware or hardware components.

In general, a spindle driver drives the spindle motor 270 to control a rotational speed of optical disc 255 via a spindle 292. The spindle driver operates in conjunction with a sled driver. The sled driver drives the sled motor 275 to control radial (track) positioning of OPU assembly 200 with respect to disc 255 along a sled drive mechanism 295. In a labeling system implementation, the sled 205 of the OPU assembly 200 may be moved along the sled drive mechanism 295 to various radii (track) positions of optical disc 255.

In a label surface marking implementation, the rotational speed of disc 255 and the radial position of OPU assembly 200 are controlled such that laser marks are written at desired locations on the disc 255 as the label side surface 265 moves past the laser beam 240.

A laser driver controls the firing of laser beam 240 to write laser marks corresponding to a label image onto the label side surface 245. Additionally, the laser driver controls the intensity of the laser beam 260 to read data maintained on the data side 296 of the optical disc 255 when the disc is positioned such that a data side 296 passes over the laser beam 260. In certain embodiments, the same side may be used for data and labeling.

Drivers 289 further include drivers for moveable VCM components 220, 225, and 230. The moveable VCM component drivers are executable on processor 283. An input signal table 297 describes input signal (voltage or current) values that may be provided to moveable VCM components 220, 225, and 230, in order to place VCM components at "in focus" positions. The VCM component drivers are provided a calibration factor as discussed below, where the calibration factor is based on calculated drift variances. The VCM component drivers, in turn, may use the calibration factor to adjust the input signals of input signal table 297 in order to place the VCM components at a "focus offset" position displaced from the "in focus" position. The calibration factor may be used to adjust for particular offset values and to account for drift.

Computing device interface 299 interfaces the controller 280 of the ODD system 175 with another electronic or computing device to receive label image data or a label file (not shown). The computing device interface 299 can be implemented as an ATAPI (Advanced Technology Attachment Packet Interface), which is one of many small computer parallel or serial device interfaces. Another common computer interface is SCSI (small computer system interface), which is a generalized device interface for attaching peripheral devices to computers. SCSI defines the structure of commands, the way commands are executed, and the way status is processed. Various other physical interfaces include the Parallel Interface, Fiber Channel, IEEE 1394, USB (Universal Serial Bus), and ATA/ATAPI. ATAPI is a command execution protocol for use on an ATA interface so that CD-ROM and tape drives can be connected via the same ATA cable with an ATA hard disc drive. ATAPI devices generally include CD-ROM drives, CD-recordable drives, CD-rewritable drives, DVD (digital versatile disc) drives, tape drives, super-floppy drives (e.g., ZIP and LS-120), and the like.

Exemplary VCM Assembly

FIG. 3A shows an exemplary VCM assembly 300. In this particular embodiment a single VCM assembly 300 is shown. Other embodiments may include multiple VCM assemblies. Exemplary VCM assembly 300 provides for movement in the "z" axis direction 235 used for focusing, and movement in the radial direction used for track selection. To select tracks, movement is made in and out from a hub of an optical disc and is referred to as radial direction 240. This is 90 degrees from the track direction, tangential, also known as the direction of track movement. In some embodiments, another mechanism is used for coarse radial positioning while the illustrated embodiment is used for fine radial positioning. In some embodiments, a VCM assembly may provide movement in a tilt or angular direction such as tilt direction 245 described in FIG. 2. A moveable structure 305 is included in VCM assembly 300 which holds the objective lens 215. Moveable structure 305 may include structures 250(1) and 250(2) described in FIG. 2. VCM assembly 300 may be supported and attached to an OPU assembly (e.g. OPU 200) through spring mechanisms or similar devices (not shown).

A single metal coil represented as block 320 is responsive to an input voltage and moves structure 305 in the "z" axis direction 235 corresponding to a particular input voltage. Metal coil 320 includes VCM 220 described in FIG. 2. Metal coil 320 is responsive to the input voltage that moves objective lens 215 in the z direction 235.

With further reference to the movement of VCM assembly 300, in one embodiment VCM assembly 300 includes two stationary magnets 325(1) and 325(2). Blocks 327(1), 327(2), 327(3), and 327(4) represent metal coils. Metal coils 327(1) and 327(2) are wound contrary to one another, such that when energized in one way, one coil pulls magnet 325(1) and the other coil repels magnet 325(1). Metal coils 327(3) and 327(4) are also wound such that when energized in one way, one coil pulls magnet 325(2) and the other coil repels magnet 325(2). Metal coils 327 and 320 work in moving structure 305. When voltage is applied to metal coils 327 and 320, magnets 325(1)–(2) either repel or attract the magnetic field created at metal coils 327 and 320 causing movement of metal coils 327 and 320 and moveable structure 305 since metal coils 327 and 320 are attached to moveable structure 305. Further, because moveable structure 305 holds objective lens 215, objective lens 215 is moved when voltage is applied to metal coils 320 and 327.

A code strip 330 is placed on structure 305. Code strip 330 includes alternating light and dark stripes that have a known width. For example, in one embodiment a line pair which includes a light and dark stripe may be 350 microns, while in another embodiment a light stripe may have a width of 175 microns and a dark stripe a width of 175 microns. Code strip 330 is oriented to move in the "z" axis 235 direction.

Figure 3B:
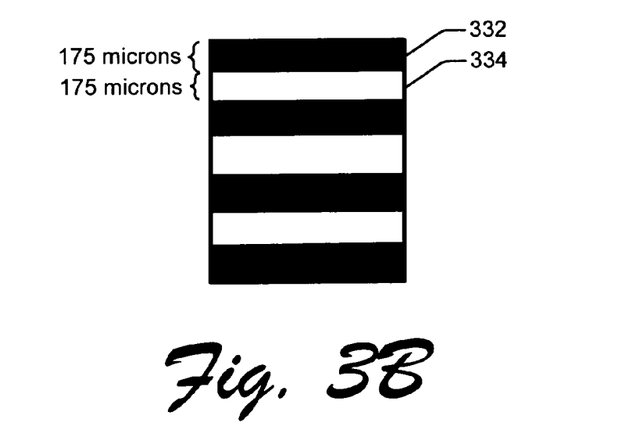
FIG. 3B is a block diagram illustrating an exemplary code strip of alternating light and dark stripes, according to an embodiment of the present invention.

FIG. 3B illustrates an exemplary code strip which code strip 330 may be configured. In this example, the code strip includes alternating light and dark strips, in particular a dark strip 332 and light strip 334 are identified. In this embodiment, dark strip 332 has a width of 175 microns and light strip 334 also has a width of 175 microns.

Referring back to FIG. 3A, an encoder 335 is configured to recognize the light and dark stripes of code strip 320. Encoder 335 is typically stationary. As voltage (input signal) is applied to metal coil 320 and structure 305 is moved up and down along the "z" axis direction 235, the alternating light and dark stripes of code strip 330 pass stationary encoder 335. In response, encoder 335 provides an encoder output signal back to controller 280. The encoder output signal is a digital pulse train in which the high and low output signal or logic levels are related to the light and dark stripes of code strip 330 passing the encoder 335. As will be described subsequently in greater detail, the period of the encoder output pulse train can be correlated to the change of the encoder input signal and, based on the known widths of the light and dark stripes, the distance of movement of structure 305 for a given change in input signal can be determined.

Another code strip 340 is placed on structure 305. Code strip 340 is similar to code strip 330 and includes alternating light and dark stripes that have a known width. Code strip 340 is placed and oriented on structure 305 to travel in the direction of track 240.

An encoder 345 is configured to recognize the light and dark stripes of code strip 340. Encoder 345 is stationary. As voltage (input signal) is applied to metal coils 315(1)–(2) and structure 305 is moved along the track direction 240, code strip 340 and its light and dark stripes pass stationary encoder 345. Stationary encoder 335 provides an encoder output back to controller 280, where the encoder output is a signal corresponding to a pattern of light and dark stripes read from code strip 340.

In one embodiment encoders 335 and 345 are reflective encoders that direct light to and detect reflected light from code strips 330 and 340. Other embodiments may make use of transmissive encoders that shine light though code strips that have alternating clear and opaque stripes.

Voltage Comparison and Calibration

Figure 4:
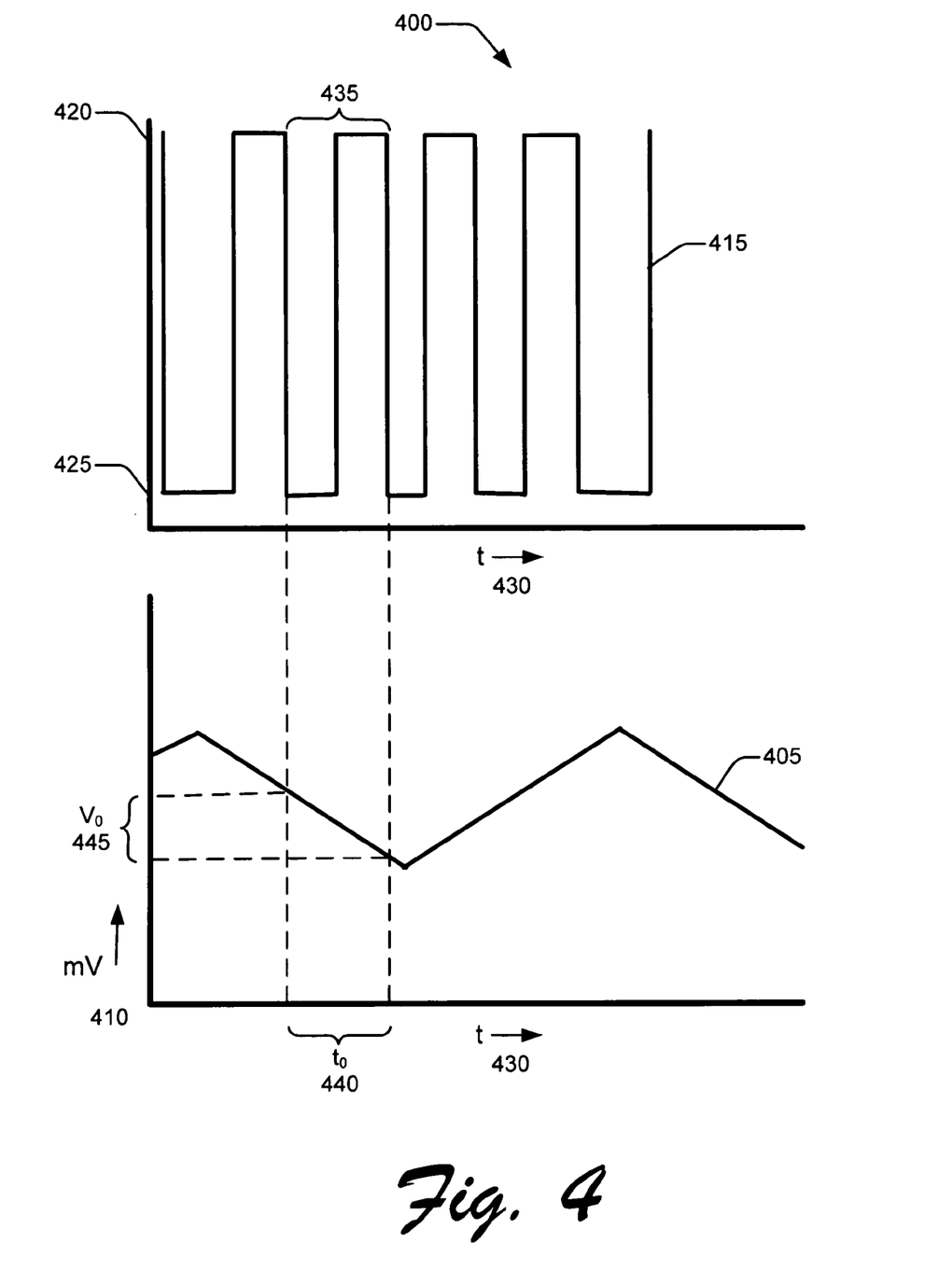
FIG. 4 is a block diagram illustrating a graph of an input voltage to a VCM plotted against a timeline and pattern of a code strip recognized by an encoder over the same timeline, according to an embodiment of the present invention.

FIG. 4 shows graphs 400 of input voltage applied to a moveable VCM component and output signals generated by an encoder. In this example input voltage 405 is applied to a moveable VCM component such as coil 320 of FIG. 3. The input voltage 405 is plotted as millivolt (mV) 410.

As described above, as an input voltage is applied to the coil 320, structure 305 is caused to move in the "z" axis 235 direction and code strip 330 passes encoder 335. The pattern of alternating light and dark stripes passing by encoder 335 during movement of structure 305 is detected by encoder 335 which produces an output signal. An exemplary output signal 415 is illustrated. When the value of output signal 415 is at a high value 420 a light stripe is detected by the encoder 335, and when the value of output signal 415 is at a low value 425 a dark stripe is detected by the encoder 335.

Signals 405 and 415 are plotted against a common timeline t 430. As input signal 410 is applied over timeline t 430, alternating light and dark stripes are detected by encoder 335 as illustrated by encoder output signal 415 representing movement of structure 305 in the "z" axis direction. Similarly, a graph may be generated as to alternating light and dark stripes detected by encoder 345 for movement of structure 305 in the "track" direction 240.

An exemplary light and dark stripe pair detected by the encoder 335 is shown as output signal segment 435. Signal segment 435 occurs during a time period $t_0$ 440. During the time period $t_0$ 440, a difference in input voltage $V_0$ 445 takes place for input signal 405.

In this example, as described above code strip 330 includes light and dark stripe pairs that are a combined 350 microns wide such that signal segment 435 represents a width of 350 microns. Furthermore, signal segment 435 represents a 350 micron movement of the code strip 330, moveable structure 305, and objective lens 215.

The absolute value of input voltage difference $V_0$ 445 is associated with signal segment 435, and indicates the amount of input voltage applied to cause movement of 350 microns. To determine the calibration factor for movement of the lens (i.e., objective lens 215 of FIG. 3), the 350 microns is divided by the absolute value of voltage difference $V_0$ 445. For example voltage difference $V_0$ 445 may have a value of 400 mV.

Since the time periods (e.g., $t_0$) may vary between line pairs, measurements may be made for various line pairs of graph 415. The calculated calibration or movement per input voltage values may be averaged to achieve an average calibration or rate of movement.

In this example graph 415 illustrates a triangle wave; however other cyclic inputs may be used as an input to a moveable VCM component (i.e., coil 320 of FIG. 3). For example, a cyclic sine wave may be used as an input. Furthermore a mechanical vibration may be used as an input signal, such as when encoder 335 is used to detect mechanical disturbance as discussed above. The information provided by encoder 335 or 345 may then be used to reduce the movement of the objective due to vibration.

Knowing an actual calibration or rate "$Cal_{act}$" which describes the amount of input voltage that causes movement of the moveable VCM component (i.e. coil 320 of FIG. 3), an input voltage value associated with an offset value (e.g., focus offset) is determined. For example, if focus offset is to be provided, the focus offset is a length or distance measurement "$L_{offset}$". The additional voltage input $V_{offset}$ to provide for the focus offset is represented by the equation:

$$V_{offset} = Cal_{act} \text{ times } L_{offset}$$

In this example, the calibration value obtained is 350 um/400 mV=0.875 um/mV.

Process to Measure Actual Calibration

Figure 5:
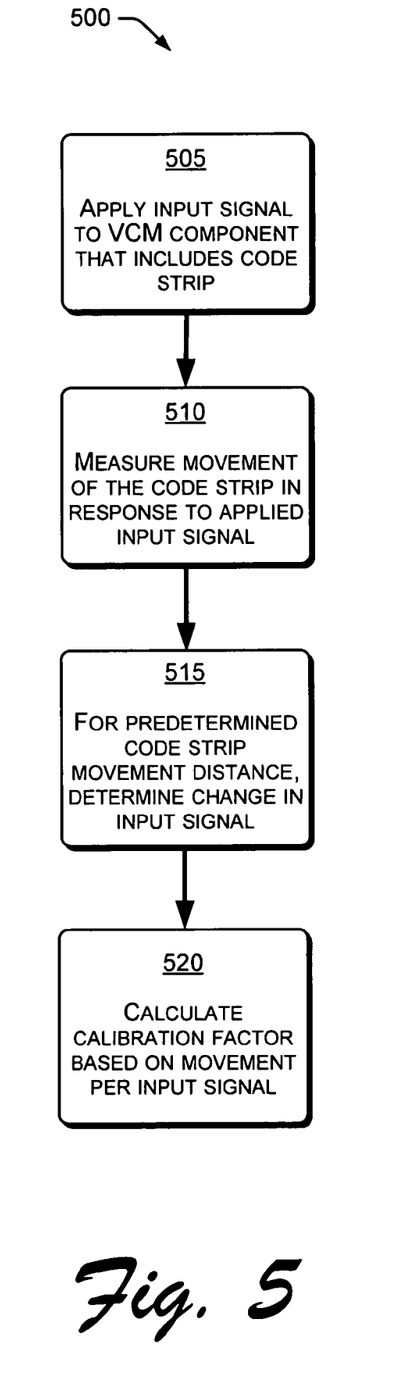
FIG. 5 is a flowchart illustrating an exemplary process in measuring actual calibration of a lens in an OPU assembly, according to an embodiment of the present invention.

FIG. 5 shows an exemplary process 500 to calibrate the z-axis positioning or radial axis positioning of an objective lens, such as objective lens 215 of FIG. 2.

At block 505, a known time varying input signal such as a voltage or current is applied to a moveable VCM component. For example, the voltage or signal may be applied to a responsive coil (e.g., coils 327 and 320 of FIG. 3). The VCM component further includes a pattern or code strip (e.g., code strips 330 and 340) which has alternating light and dark stripes detectable by an a stationary encoder when positioned adjacent thereto. The input signal causes the moveable VCM component and code strips to move in a particular direction such as the "z" axis direction (e.g., "z" axis 235 of FIG. 3) or track direction (e.g., track 240 of FIG. 3) relative to an optical disc.

At block 510, movement of the code strip is tracked (measured) in response to (relative to) the applied input signal. In particular, the values of the input signal applied to the VCM component are tracked over time. The portion of the code strip positioned adjacent the encoder is also determined. In particular the encoder detects the alternating light and dark stripes as they pass adjacent the encoder; a dark stripe is detected and a time is measured, then a light stripe is detected and another time measured. The encoder output may be plotted as several of the light and dark stripes of the code strip pass the encoder to produce a code strip graph (e.g., graph 415 of FIG. 4). A graph of the input signal and the encoder output versus time may be plotted (e.g., graph 405 of FIG. 4). The applied input signal is typically cyclic with a defined period, such as a triangle waveform or a sine wave.

At block 515, a determination is made of the input signal change required to move the code strip a known distance. The movement of the code strip is representative of movement of the VCM component in a particular direction, since the code strip is mounted on the VCM component. Using the graphs derived in block 510, a particular section of the code strip graph, such as signal segment 435 which is representative of movement of the code strip a known distance corresponding to the known widths of stripes 332, 334, may be chosen. This movement occurs over the time segment corresponding to the signal segment, such as time segment $t_0$ 440. Over that particular time segment $t_0$ 440, the corresponding value of the change in input signal, i.e. voltage change $V_0$ 445, was applied to move the code strip (i.e., VCM component) the known distance.

At block 520, a calibration factor is calculated by dividing the voltage change of block 515 by the known distance of block 515. The calibration factor may subsequently be used during operation of the optical drive to calculate the voltage offset values needed to achieve a focus offset, track offset, or tilt offset position change of the appropriate VCM component.

The calibration factor may be periodically recalculated in order to account for the effects of drift in the system. By recalculating the calibration factor before or during operation, accurate positioning can be maintained.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. An optical pickup unit (OPU) assembly comprising:
   a moveable structure;
   a moveable voice coil motor (VCM) component that produces a movement of the moveable structure in response to an input signal;
   an encoder configured to read a pattern on the moveable structure and generate an output signal corresponding to the movement of the pattern as the input signal is applied for a period of time; and a controller that receives the output signal and calculates a calibration factor relating the movement to the input signal.

2. The OPU assembly of claim 1 wherein the moveable structure comprises a lens to read data from and to label an optical disc.

3. The OPU assembly of claim 1 wherein the controller, using the calibration factor, calculates an adjusted input signal to offset the position of the moveable structure.

4. The OPU assembly of claim 1 further comprising a second moveable VCM component that produces movement in a second direction orthogonal to the first direction responsive to a second input signal, wherein a second encoder is configured to read a second pattern on the second moveable VCM component and generate a second output signal corresponding to movement of the second input signal and the controller receives the second output signal and calculates a second calibration factor.

5. The OPU assembly of claim 1 wherein the input signal is a voltage signal.

6. The OPU assembly of claim 1 wherein the input signal is a periodic triangle wave.

7. The OPU assembly of claim 1 wherein the input signal is a periodic sine wave.

8. The OPU assembly of claim 1 wherein the input signal is a mechanical vibration.

9. The OPU assembly of claim 1 wherein the encoder is a reflective encoder.

10. The OPU assembly of claim 1 wherein the encoder is a transmissive encoder.

11. The OPU assembly of claim 1 wherein the pattern is part of a code strip comprised of alternating light and dark stripes.

12. An optical disc drive that comprises the OPU assembly of claim 1.

13. A method comprising:

applying an input signal to a voice coil motor (VCM) component that includes a pattern, wherein the VCM component is caused to move in a particular direction;

measuring movement of the pattern in response to the applied input signal, and determining a change in the input signal corresponding to a particular amount of pattern distance movement.

14. The method of claim 13, further comprising calculating a calibration factor based on the determining by dividing the change in input signal by the amount of pattern distance movement.

15. The method of claim 13, wherein the input signal is a time-varying signal.

16. The method of claim 13 wherein the input signal is a voltage signal.

17. The method of claim 13 wherein the input signal is a periodic signal.

18. The method of claim 13 wherein the pattern includes light and dark stripes of a known width.

19. The method of claim 13 wherein the direction is in a "z" axis direction perpendicular to an optical disc.

20. The method of claim 13 wherein the direction is in a "track" direction parallel to an optical disc.

21. The method of claim 13 wherein the direction is in a "tilt" direction angular to an optical disc.

22. The method of claim 13 further comprising calculating an offset input signal based on the calibration factor, the offset input signal adapted to cause the VCM component to move an offset distance when applied to the VCM component.

23. The method of claim 22 wherein the offset distance is a focus offset distance used in labeling an optical disc.

24. The method of claim 22 wherein the offset distance is a radial positioning offset distance used in labeling an optical disc.

25. The method of claim 14 further comprising adjusting for drift by repeating the applying, measuring, determining, and calculating.

26. A processor-readable medium comprising processor-executable instructions for measuring actual movement of a lens in an optical pickup unit assembly, the processor-executable instructions comprising instructions for:

applying an input signal to a moveable voice coil motor (VCM) component that moves the lens in a particular direction;

measuring movement of a pattern on the VCM component in response to the applied input signal;

determining a distance of pattern movement corresponding to a change in the input signal; and calculating a calibration factor based on the distance of pattern movement and the change in the input signal.

27. The processor-readable medium of claim 26 wherein the determining is performed for more than one time period, and the calculating is based on the averages of the time periods.

28. The processor-readable medium of claim 26 further comprising determining an offset input signal to move the VCM component to an offset distance based on the calibration factor.

29. An optical disc drive (ODD) comprising:

means for applying an input signal to a VCM component that moves a lens in a direction relative to an optical disc;

means for measuring a movement of a pattern on the VCM component responsive to the input signal;

means for determining the amount of pattern movement resulting from a change in the input signal; and means for calculating a calibration factor based on the amount of pattern movement resulting from the change in the input signal.

30. The ODD of claim 29 further comprising adjusting means for moving the VCM component to an offset position using the calibration factor.

* * * * *